United States Patent
Ali et al.

(10) Patent No.: US 12,229,152 B2
(45) Date of Patent: Feb. 18, 2025

(54) SYSTEMS AND METHODS OF DYNAMIC PAGE LAYOUT USING EXPLORATION-EXPLOITATION MODELS

(71) Applicant: Walmart Apollo, LLC, Bentonville, AR (US)

(72) Inventors: Afroza Ali, Los Altos, CA (US); Zhihao Huang, San Jose, CA (US); Abhimanyu Mitra, Cupertino, CA (US); Atul Kochhar, Karnataka (IN); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/104,112

(22) Filed: Jan. 31, 2023

(65) Prior Publication Data
US 2024/0256556 A1 Aug. 1, 2024

(51) Int. Cl.
*G06F 16/2457* (2019.01)
*G06F 9/451* (2018.01)
*G06F 16/215* (2019.01)
*G06F 16/248* (2019.01)

(52) U.S. Cl.
CPC ........ *G06F 16/24578* (2019.01); *G06F 9/451* (2018.02); *G06F 16/215* (2019.01); *G06F 16/24575* (2019.01); *G06F 16/248* (2019.01)

(58) Field of Classification Search
CPC .. G06F 16/24578; G06F 9/451; G06F 16/215; G06F 16/24575; G06F 16/248
See application file for complete search history.

(56) References Cited

U.S. PATENT DOCUMENTS 11,308,543 B1  4/2022 Mantha et al.
11,797,891 B1* 10/2023 Musiboyina ........... G06N 20/00
(Continued)

OTHER PUBLICATIONS

A. Mantha et al., "A Real-Time Whole Page Personalization Framework for E-Commerce," https://www.walmart.com/grocery, arXiv:2012.04681v1 [cs.IR], Dec. 8, 2020, 5 pages.
(Continued)

*Primary Examiner* — Etienne P Leroux
*Assistant Examiner* — Husam Turki Samara
(74) *Attorney, Agent, or Firm* — Morgan, Lewis & Bockius LLP; Manita Rawat

(57) ABSTRACT

Systems and methods for generating dynamic interfaces using explore-exploit models is disclosed. A first interface including a first set of content modules selected from a set of candidate content modules is generated and feedback data representative of one or more interactions with the first interface is received. The feedback data includes positive feedback and negative feedback. A set of weights for each content module is generated by a contextual explore-exploit model based on the feedback data. A request for a second interface including a context is received and a set of ranked content modules is selected for the context based on the weights of each of the content modules in the set of candidate content modules. A second interface including a second set of content modules is generated. The second set of content modules includes a predetermined number of top ranked content modules in the set of ranked content modules.

20 Claims, 11 Drawing Sheets

(56) References Cited

U.S. PATENT DOCUMENTS

| | | | |
|---|---|---|---|
| 2014/0188925 A1* | 7/2014 | Skolicki | H04N 21/4828 |
| | | | 707/765 |
| 2022/0044309 A1 | 2/2022 | Jose | |
| 2023/0289868 A1* | 9/2023 | Bender | G06F 16/954 |

OTHER PUBLICATIONS

B. Rahdari et al., "From Ranked Lists to Carousels: A Carousel Click Model," arXiv:2209.1342v1 [cs.IR], Sep. 27, 2022, 9 pages.
Y. Zhang, "Homepage for Recommendation with Exploitation and Exploration," DoorDash Engineering, Oct. 5, 2022, 22 pages.
M. F. Dacrema et al., "Offline Evaluation of Recommender Systems in a User Interface With Multiple Carousels," Frontiers in Big Data, vol. 5, Article 910030, Jun. 9, 2022, 21 pages.

* cited by examiner

SYSTEMS AND METHODS OF DYNAMIC PAGE LAYOUT USING EXPLORATION-EXPLOITATION MODELS

TECHNICAL FIELD

This application relates generally to generation of network interfaces, and more particularly, to selection of content creators using explore-exploit models.

BACKGROUND

Current network interfaces include content generated by content suggestion mechanisms. Content within the interface is selected based on large trends, such as seasonal trends, platform-wide trends, or user specific data. The content is selected to a user via a network interface page.

Current systems utilize only positive feedback to determine suggested content. Positive feedback includes feedback on actions taken by a user after being presented with an interface. For example positive feedback can include click rates for interface elements presented to a user. However, current systems are only able to suggest content based on positive interactions and therefore can continue to recommend unwanted or less applicable content to a user.

SUMMARY

In various embodiments, a system is disclosed. The system includes a non-transitory memory and a processor communicatively coupled to the non-transitory memory. The processor is configured to read a set of instructions to generate a first interface including a first set of content modules selected from a set of candidate content modules and receive feedback data representative of one or more interactions with the first interface. The feedback data includes positive feedback and negative feedback. The processor is further configured to read the set of instructions to generate a set of ranking weights for each content module in the set of candidate content modules. The ranking weights are generated by a contextual explore-exploit model based on the feedback data. The processor is further configured to read the set of instructions to receive a request for a second interface including a context, generate a set of ranked content modules for the context based on the ranking weights of each of the content modules in the set of candidate content modules, and generate a second interface including a second set of content modules. The second set of content modules includes a predetermined number of top ranked content modules in the set of ranked content modules.

In various embodiments, a computer-implemented method is disclosed. The computer-implemented method includes steps of generating a first interface including a first set of content modules selected from a set of candidate content modules and receiving feedback data representative of one or more interactions with the first interface. The feedback data includes positive feedback and negative feedback. The computer-implemented method further includes the step of generating a set of ranking weights for each content module in the set of candidate content modules. The ranking weights are generated by a contextual explore-exploit model based on the feedback data. The computer-implemented method further includes the steps of receiving a request for a second interface including a context, generating a set of ranked content modules for the context based on the ranking weights of each of the content modules in the set of candidate content modules, and generating a second interface including a second set of content modules. The second set of content modules includes a predetermined number of top ranked content modules in the set of ranked content modules.

In various embodiments, a computer-implemented method is disclosed. The computer-implemented method includes steps of receiving a candidate content module, initializing the candidate content module to include a set of default ranking weights, generating a first interface including the candidate content module, and receiving feedback data representative of one or more interactions with the first interface. The feedback data includes positive feedback and negative feedback. The computer-implemented method further includes a step of generating a set of updated ranking weights for the candidate content module. The set of updated ranking weights is generated by a contextual explore-exploit module based on the feedback data. The computer-implemented method further includes a step of providing the candidate content module including the set of updated ranking weights to a ranking process configured to select a set of contextual content models for inclusion in a second interface.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
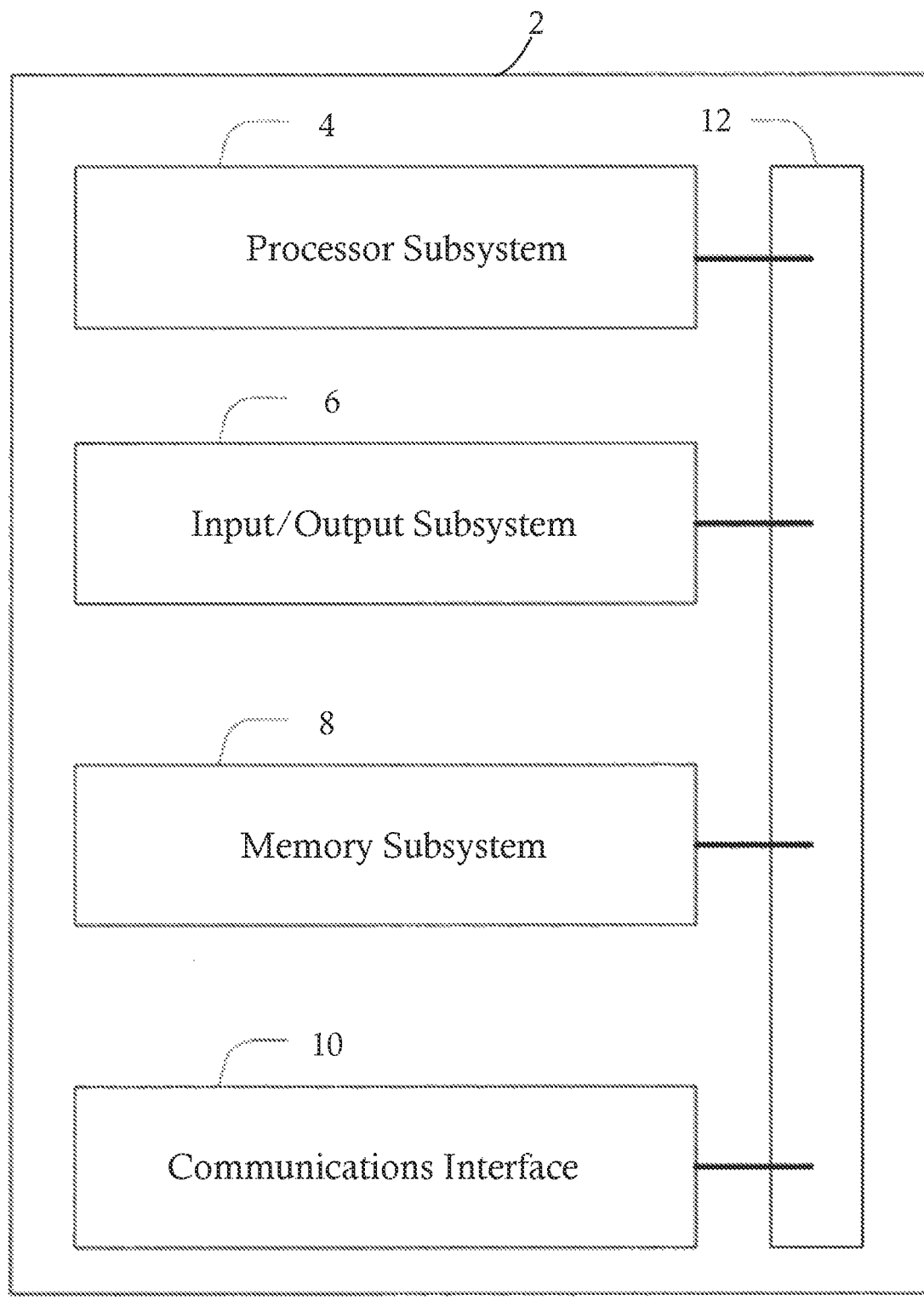
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for generating a network interface including content modules selected based on active and implicit feedback. In various embodiments, an interface generation engine is configured to select a set of recommended content modules from a plurality of available content modules. The interface generation engine is configured to segment a user into one of a set of predefined segments and rank available content modules based on the user segmentation. The content modules are ranked according to weights generated by a content recommendation engine. The content recommendation engine includes a context explore/exploit module configured to incorporate both active and implicit feedback. The content recommendation engine can additionally include a deduplication and diversification module to increase diversity of the recommended content modules.

As used herein, the term "active feedback" refers to data generated by active user interactions with an interface. Examples of active feedback can include, but are not limited to, click rate, add-to-cart, purchase, or other actions taken with respect to an interface. As used herein, the term "implicit feedback" refers to data generated by passive user interaction, e.g., based on actions not taken with an interface. Examples of implicit feedback can include, but are not limited to, modules that are not interacted with, e.g., received no clicks when presented on an interface, interface pages that are quickly closed or changed, and/or other passive or non-interactions with an interface.

In some embodiments, systems and methods for generating a network interface including content modules selected based on active and implicit feedback includes a trained explore/exploit model configured to select content modules based on explore mechanism, e.g., identifying new or underused modules, and exploit mechanism, e.g., including modules having higher likelihood of interaction or relevance to a user.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, a neural network which is trained (e.g., configured or adapted) to contextually rank content modules using explore/exploit mechanics, is disclosed. A neural network trained to contextually rank content modules using explore/exploit mechanics may be referred to as a trained contextual ranking model, a trained explore/exploit model, a trained contextual explore/exploit model, etc. The trained contextual ranking model can be configured to receive contextual features associated with one or more user contexts and generate weights for each content module in a plurality of content modules. In some embodiments, the trained contextual ranking model is configured to generate weights for each of a plurality of contexts.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for generating a network interface including content modules selected based on positive and negative feedback, as described herein. The instruction set can be stored in any acceptable form of machine-readable instructions, including source code or various appropriate programming languages. Some examples of programming languages that can be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processor subsystem 4.

Figure 2:
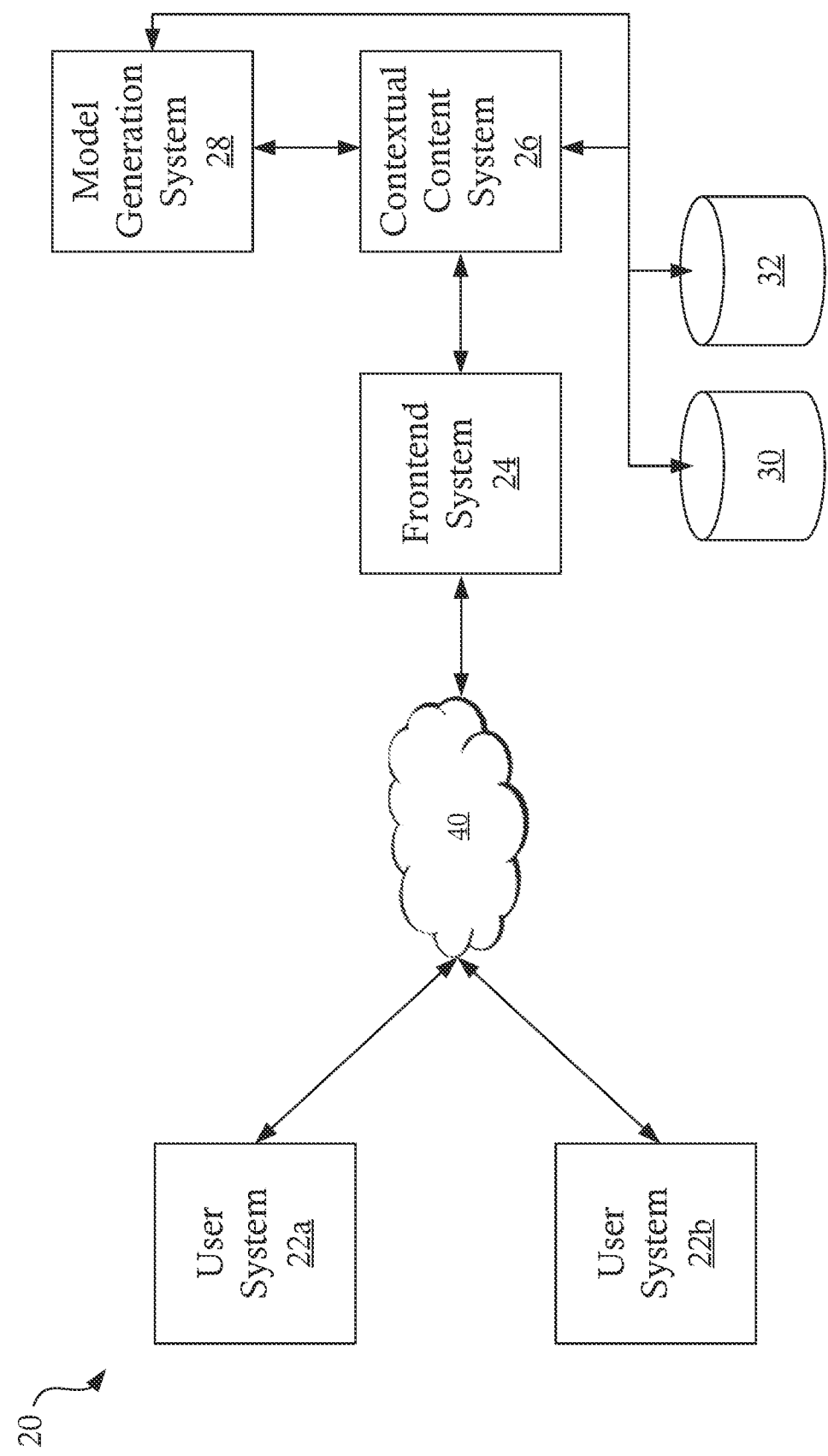
FIG. 2 illustrates a network environment configured to provide a network interface including suggested modules selected using active and implicit feedback, in accordance with some embodiments.

FIG. 2 illustrates a network environment 20 configured to generate and provide a network interface including content modules selected based on positive and negative feedback, in accordance with some embodiments. The network environment 20 includes a plurality of systems configured to communicate over one or more network channels, illustrated as network cloud 40. For example, in various embodiments, the network environment 20 can include, but is not limited to, one or more user devices 22a, 22b, a frontend system 24, a contextual content selection system 26, a model generation system 28, an interaction database 30, and a model store database 32. It will be appreciated that any of the illustrated systems can include a system as described above in conjunction with FIG. 1. Although specific embodiments are discussed, herein it will be appreciated that additional systems, servers, storage mechanism, etc. can be included within the network environment 20.

Further, although embodiments are illustrated herein having individual, discrete systems, it will be appreciated that, in some embodiments, one or more systems can be combined into a single logical and/or physical system. For example, in various embodiments, the frontend system 24, the contextual content selection system 26, the model generation system 28, the interaction database 30, and the model store database 32 can be combined into a single logical and/or physical system. Similarly, although embodiments are illustrated having a single instance of each system, it will be appreciated that additional instances of a system can be implemented within the network environment 20. In some embodiments, two or more systems can be operated on shared hardware in which each system operates as a separate, discrete system utilizing the shared hardware, for example, according to one or more virtualization schemes.

In some embodiments, the user systems 22a, 22b are configured to receive and/or generate a user interface to allow a user to interact with services and/or resources provided by a network system, such as frontend system 24. The user interface can include any suitable interface, such as, for example, a mobile device application interface, a network interface, and/or any other suitable interface. For example, in some embodiments, the frontend system 24 includes an interface generation engine configured to generate a customized network interface and provide the customized network interface, and/or instructions for generating the customized network interface, to a user system 22a, 22b, which displays the user interface via one or more display elements. The customized network interface can include any suitable network interface, such as, for example, an e-commerce interface, a service interface, an intranet interface, and/or any other suitable user interface. In some embodiments, the customized interface includes a webpage, web portal, intranet page, application page, and/or other interactive interface. The customized network interface includes at least one recommended content module selected, at least in part, by a trained contextual ranking model.

In some embodiments, the frontend system 24 is in signal communication with a contextual content system 26 configured to generate a set of contextually relevant content modules for inclusion in an interface. The frontend system 24 and/or the context content system 26 can implement a ranking model configured to rank content modules based on a segmentation associated with a request for an interface and a set of weights associated with the each of the content modules. For example, in some embodiments, a ranking model is configured to receive a user segmentation generated based on a user identifier included in a request and rank a set of content modules based on the user segmentation and a set of module weights generated by a module weighting engine. Although specific embodiments are discussed herein, it will be appreciated that any suitable ranking model utilizing an explore/exploit component can be utilized.

In some embodiments, a module weighting engine includes a contextual explore/exploit model and a duplication and diversification module. The contextual explore/exploit model is configured to generate weights for a set of content modules based on both positive and negative feedback. For example, in some embodiments, the contextual explore/exploit model includes a contextual bandit model utilizing user intent features, user sub-category affinities, and incorporating click and no-click feedback. The duplication and diversification module is configured to filter content modules to ensure diversity between multiple models selected for inclusion in an interface.

In some embodiments, trained models can be generated by a model generation system 28. The model generation system 28 is configured to generate one or more trained models using, for example, iterative training processes. For example, in some embodiments, a model training engine is configured to receive positive and negative feedback data and generate one or more trained contextual explore/exploit models. The positive and negative feedback data can be stored, for example, in interaction database 30.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
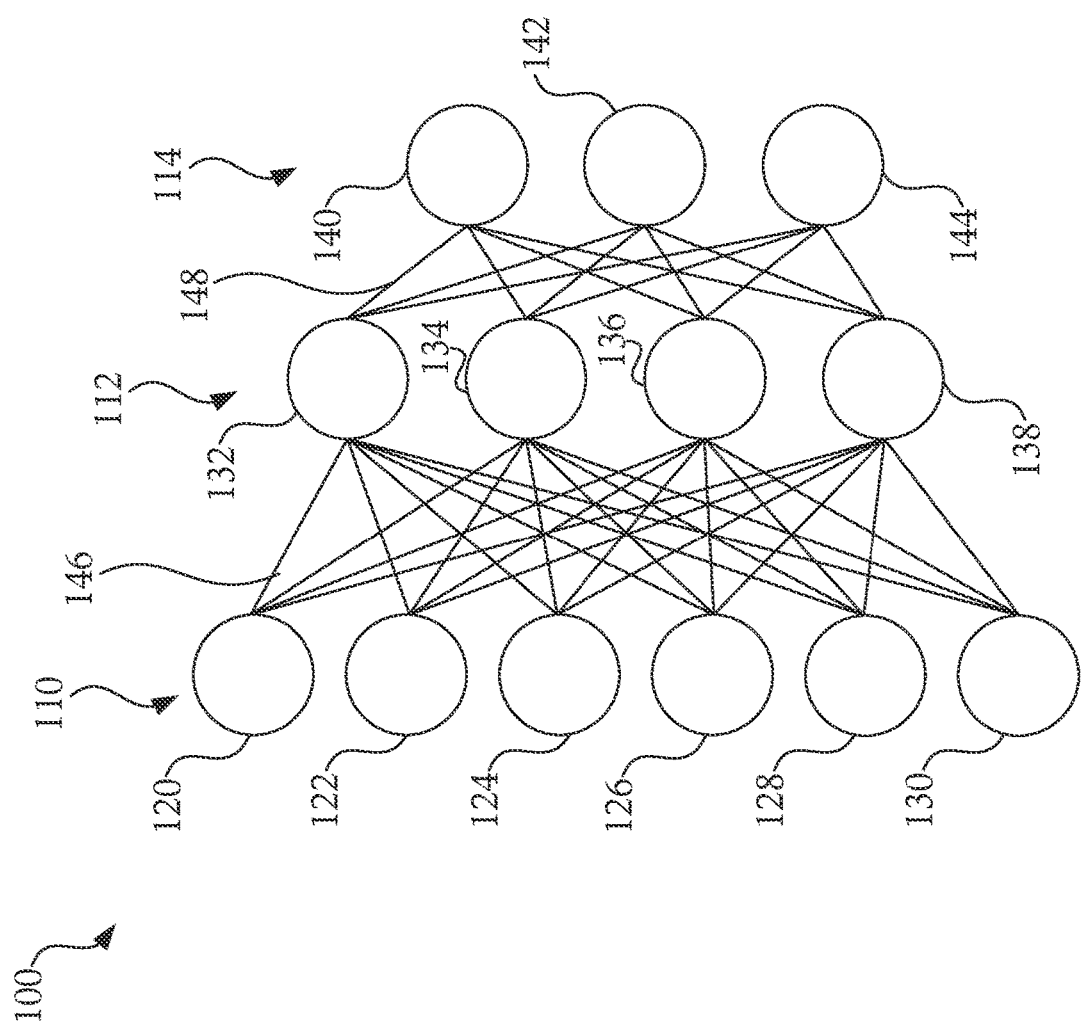
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval $[-1, 1]$, within the interval $[0, 1]$, and/or within any other suitable interval. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ is defined for the weight $w_{i,j}^{(n,n+1)}$.

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein $\gamma$ is a learning rate, and the numbers $\delta_j^{(n)}$ can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta_j^{(n+1)}$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $y_j^{(n+1)}$ is the comparison training value for the j-th node of the output layer 114.

Figure 4:
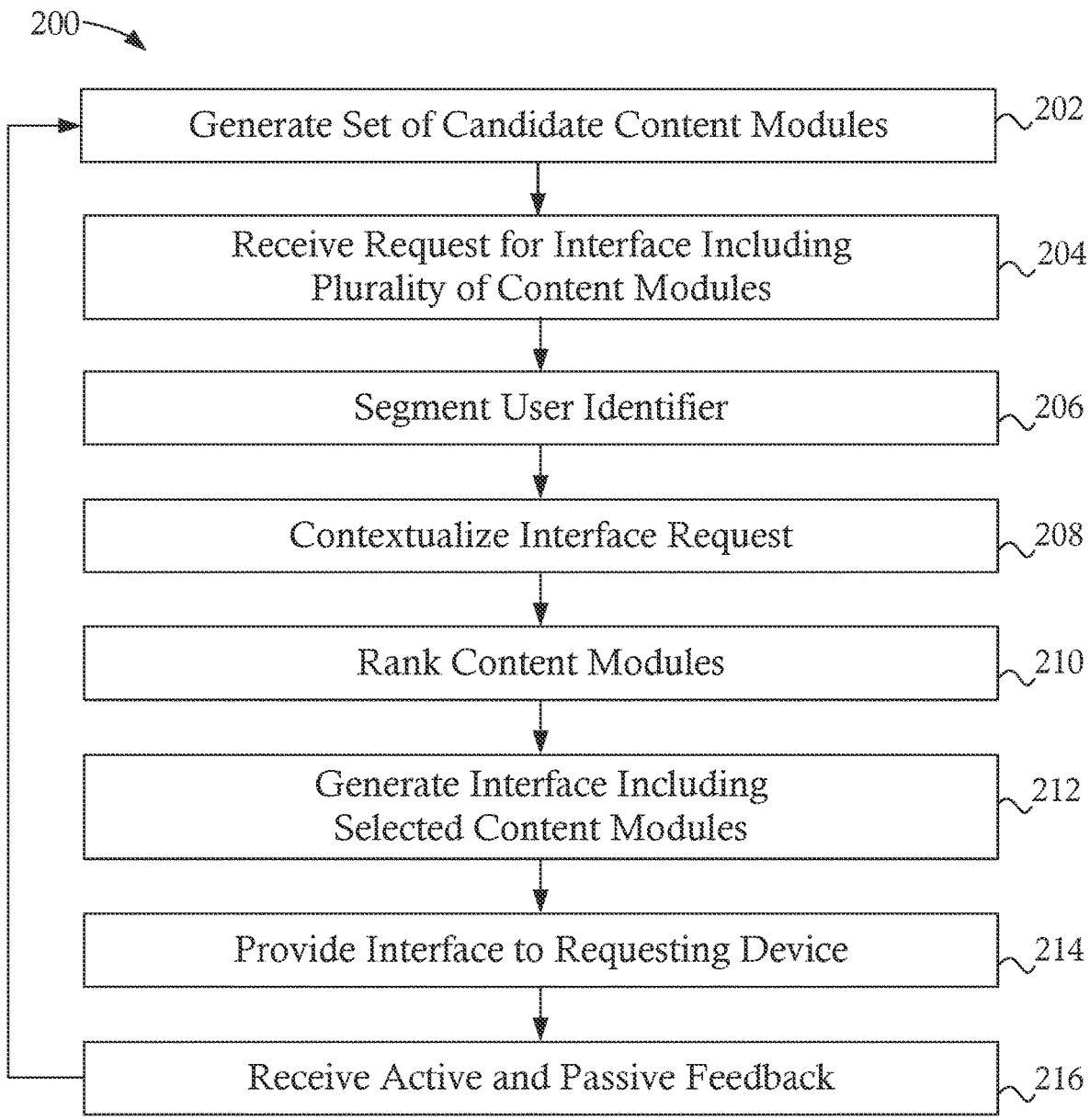
FIG. 4 is a flowchart illustrating a method of generating an interface including suggested modules, in accordance with some embodiments.
Figure 5:
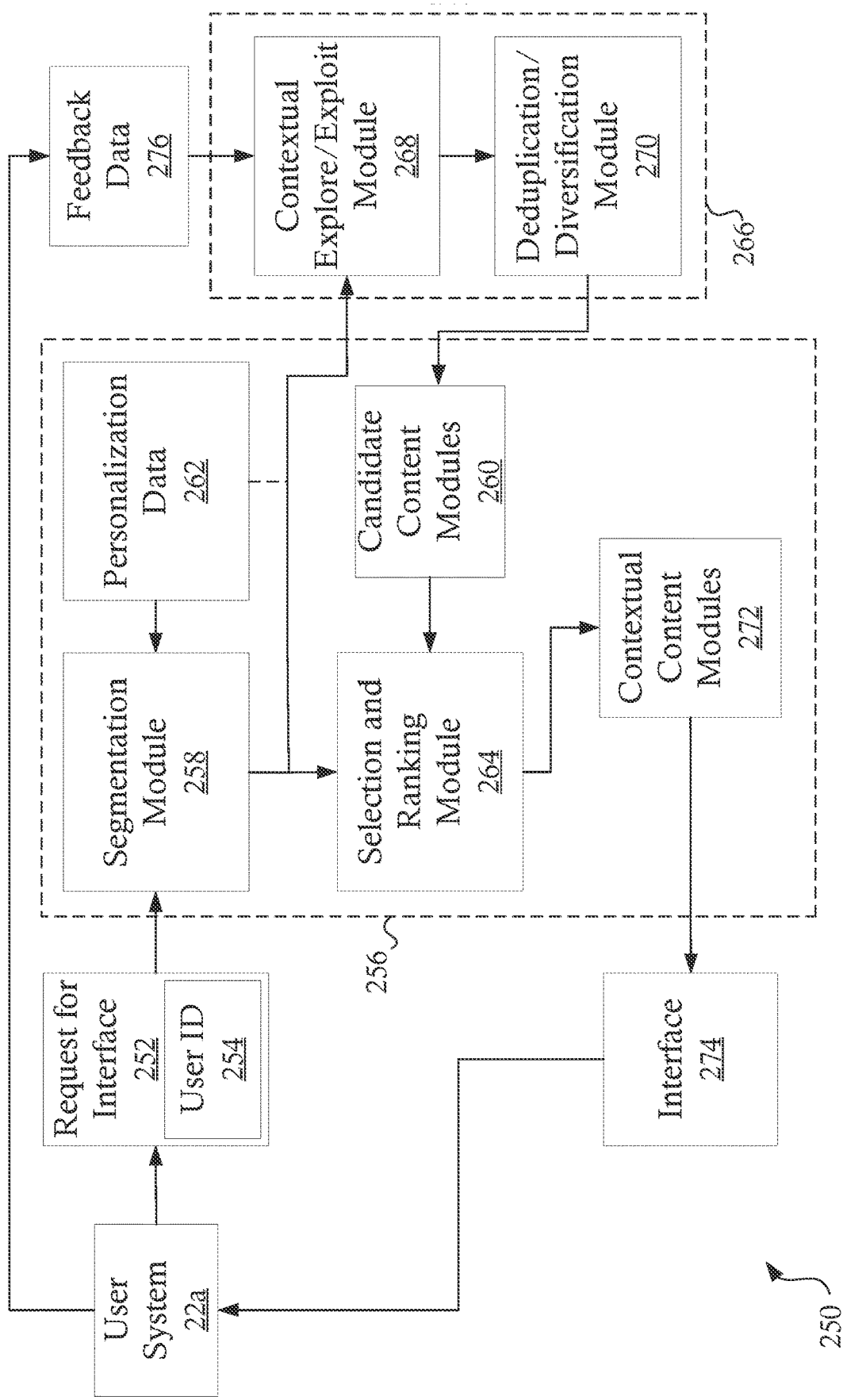
FIG. 5 is a process flow illustrating various steps of the method of generating an interface including suggested modules, in accordance with some embodiments.

FIG. 4 is a flowchart illustrating a method 200 of generating an interface including recommended content modules, in accordance with some embodiments. FIG. 5 is a process flow 250 illustrating various steps of the method 100 of generating an interface including recommended content modules, in accordance with some embodiments. At step 202, a set of candidate content modules 260 is generated. The set of candidate content modules 260 includes a plurality of content modules configured for insertion into an interface, such as interface 274 as discussed in greater detail below. Each content module in the set of candidate content modules 260 includes one or more weights configured to provide ranking of the content module for inclusion in a requested interface. The weights for each of the content modules can include default weights and/or weights generated by a contextual engine 266.

In some embodiments, the contextual engine 266 includes a contextual explore/exploit module 268 and a deduplication/diversification module 270. The contextual explore/exploit module 268 is configured to generate ranking weights for a plurality of content modules based on a provided context. For example, contexts can include various life-stage categories, such as, for example, new parent, college-age, etc. The context can similarly include various categories related to events or interests, such as new parent/baby, gamer/gaming, hiker/outdoor gear, etc. In some embodiments, the contexts include personalized contexts, e.g., contexts based on user history such as brand-preference contexts, color-preference contexts, style-preference contexts, etc. Although specific embodiments are discussed herein, it will be appreciated that the contexts can include any suitable user context defined based on any suitable characteristics and/or parameters of a network interface and/or user of a network interface.

At step 204, a request 252 for a user interface is received by an interface generation engine 256. The request 252 can be received from a user system 22a, 22b configured to provide a user interface to a user. In some embodiments, the request 252 includes a user identifier 254 associated with a user and/or the user system 22a, 22b. The user identifier 254 can be generated by any suitable mechanism, such as, for example, a cookie, beacon, and/or other identifier stored on and/or provided to a user system 22a, 22b.

At step 206, a user segment is identified for the request 252. In some embodiments, the request 252 includes a user identifier 254 and a user segment is identified for the user identifier 254. For example, in some embodiments, a user identifier 254 can be segmented into one or more of a plurality of user segments based on a context of the request 252, historical data associated with the user identifier 254, and/or any other suitable data. The plurality of user segments can include segmentation into a context or segment corresponding to the contexts used by the contextual explore/exploit module 268 to generate a set of candidate content modules 260. For example, a user identifier 254 can be segmented into various contexts such as new parent, baby, college-age, gamer, hiking, outdoor gear, grocery, etc.

At step 208, an interface request 252 is contextualized based on the segmentation at step 206 and one or more sets of candidate content modules 260 is obtained. For example, if a request 252 is segmented into a first segment and a second segment, a first set of candidate content modules associated with the first segment and a second set of candidate content modules associated with the second segment can be obtained. The set of candidate content modules 260 can include content modules such as a carousels, banners, and/or other content elements that include items or content relevant to the selected segment. For example, if the request 252 is segmented into a first segment of "new parents" and a second segment of "baby," the obtained candidate content modules can include items selected from a catalog that are categorized as "new parent" or "baby" items, associated with a "new parent" or "baby" context, and/or otherwise associated with the "new parent" or "baby" segments.

In some embodiments, the set of candidate content modules 260 includes generic or universal content modules. For example, one or more of the contextual content modules 260 can include a site-wide or generic set of items or content that is associated with high traffic portions of an interface. In an e-commerce environment, a generic content module can include, for example, seasonal items, high-traffic items, promotional items, etc.

In some embodiments, the set of candidate content modules 260 includes a set of dynamically changing content modules. Each of the candidate content modules 260 is weighted based on both active and implied, e.g., positive and negative, feedback, as discussed in greater detail below. The content modules 260 can include thematic groupings of interface items, e.g., groupings of items selected from a catalog associated with the interface according to one or more defined categories. In the context of an e-commerce interface, thematic groupings can include, but are not limited to, departments, sub-departments, seasons, and promotions.

At step 210, a set of contextual content modules 272 is selected from the set of candidate content modules 260. For example, in some embodiments, the set of candidate content modules 260 can be ranked based on one or more parameters, such as, for example, the set of weights determined by the contextual engine 266, and the N highest ranked candidates can be selected as the set of contextual content modules 272, where N is a positive integer. In some embodiments, the set of candidate content modules 260 is ranked by a selection and ranking module 264 configured to implement at least one trained ranking model. The ranking model can include any suitable ranking model, such as a learning to rank model, a clustering model, and/or any other suitable model.

In some embodiments, the selection and ranking module 264 is configured to select content modules from the set of candidate content modules 260 based on interface-wide explore-exploit mechanisms, such as the contextual explore-exploit module 268. The selection and ranking module 264 is configured to personalize the set of contextual content modules 272 to be contextually relevant to each segment, e.g., category or sub-category, identified for the user identifier 254 by the segmentation module 258. In some embodiments, the set of candidate modules 260 can be provided by any suitable content source, such as, for example, an internal content database, external content database, third-party content providers, etc.

In some embodiments, the selection and ranking module 264 is configured to receive personalization data 262 for personalizing rankings for a user associated with the user identifier 254. For example, in some embodiments, personalization data 262 can include historical interaction data indicative of prior interactions with an interface associated with the user identifier. Personalization data 262 can include, but is not limited to, historic purchase data, historic add-to-cart data, historic click data, express user preferences, and/or any other suitable historical data. The use of personalization data 262 provides for personalization of the contextual content modules 272 and/or layout of the contextual content modules 272 based on temporal, geographic, and/or user-specific data.

In some embodiments, the selection and ranking module 264 includes a reinforcement learning system configured to select a set of contextual content modules 272 based, at least in part, on user intent features and/or sub-category affinities. For example, the selection and ranking module 264 can include a contextual bandit approach, a state-action-reward-state-action (SARSA) process, Thompson sampling, etc. Example content selection systems are disclosed in U.S. Pat. No. 11,314,529 entitled "Dynamical Switching Between Long-Term and Short-Term Rewards," issued Apr. 26, 2022, and U.S. Pat. Appl. Pub. No. 2021/0334852, entitled "Automated Mechanisms to resolve Explore-Exploit Dilemma with Adaptive Revival Opportunities," published Oct. 28, 2021, each of which is incorporated herein by reference in its entirety.

The selection and ranking module 264 is configured to provide relevant contextual content modules 272 for user identifiers 254 having no historical data, some historical data, and/or large amounts of historical data. For example, when a user identifier 254 is new, e.g., cannot be segmented, the selection and ranking module 264 can select the most relevant content modules based solely on global contextual explore-exploit weights generated by the contextual module 266. As another example, when a user identifier 254 has some personalization data 262 associated therewith, e.g., the user identifier 254 can be segmented, the selection and ranking module 264 can select the most relevant content modules based on the selected segment. As yet another example, when a user identifier 254 has a large volume of personalization data 262 associate therewith, the selection and ranking module 264 can select the most relevant content modules based on a selected segment and further adjusted based on personalization data 262.

At step 212, an interface 274 including at least one of the contextual content modules 272 is generated. For example, in some embodiments, the N top ranked contextual content modules 272 are included in the interface 274, where N is a positive integer. The contextual content modules 272 can be presented within predetermined portions of the interface 274, such as portions of the interface 274 designated to receive the content modules. In some embodiments, the contextual content modules include interface elements that provide links or other potential interactions for navigating within and/or obtaining functions from the presented interface 274.

Figure 6:
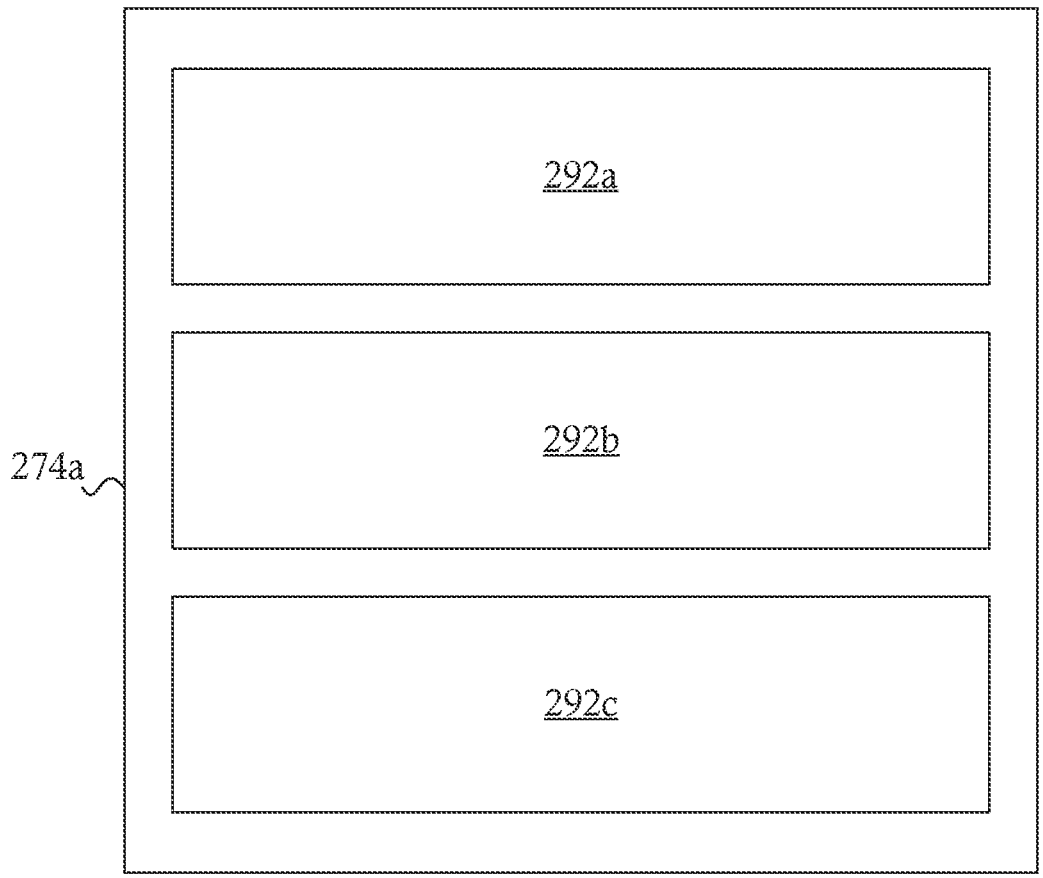
FIG. 6 illustrates a generated interface including content modules selected using active and implicit feedback, in accordance with some embodiments.

For example, as illustrated in FIG. 6, an interface 274a can include a set of contextual content modules 272a-272c selected from a set of candidate content modules 258 by a module selection and ranking module 264. The set of contextual content modules 272a-272c included in the interface 274a are the top 3 candidate content modules 258 selected based on the user context and personalization data, as discussed above. In some embodiments, each of the contextual content modules 272a-272c includes a carousel configured to display a plurality of item interface elements including, for example, item images, image titles, etc., and providing a link or other interface transition to an interface page dedicated to the represented item.

With reference again to FIGS. 4-5, at step 214, the interface 274 is provided to the system or device that generated the original request 252. For example, if a user system 22a generates a request 252 for an interface, the interface 274, and/or instructions for generating the interface 274, are provided to the user system 22a. The interface 274 can be displayed through a display formed integrally with the requesting system, allowing an operator of the requesting system to interact with the provided interface.

At step 216, feedback data 276 is receive from the user system. The received feedback data 276 includes both active and implicit feedback. For example, a user interface 274 can be provided including at least two contextual content modules 272. An item from a first contextual content module can be selected, causing the interface 274 to navigate to an interface page including information about the selected item. An interaction with the first contextual content module includes both active feedback, i.e., in the form of the active interaction with the first contextual content module, and inherent feedback, i.e., in the form of the non-interaction with the second contextual content module. Feedback can be received for the entire interface 274 and/or for individual contextual content modules 272 included in the interface. Active feedback can include, but is not limited to, click rate, browsing, dismissal, and/or any other suitable active interaction with a contextual content module 272. Similarly, passive feedback can include, but is not limited to, a lack of click rate for a content module, lack of browsing, and/or any other omission of an expected or desired interaction.

The feedback data 276 is provided to context engine 266, which is configured to generate updated weights for each content module in the set of candidate content modules 260, as discussed in greater detail below. When an additional interface request 252 is received, the updated weights can be used to select an updated set of contextual content modules 272 for inclusion in a generated interface. For example, a first interface, such as interface 274a illustrated in FIG. 7, can be generated including a first set of contextual content modules 272a-272c. The interface 274a can be provided to a user system and feedback data 276 can be received. The feedback data 276 can include active feedback, such as one or more interactions with a first contextual content module 272a, and implicit feedback, such as a lack of interaction with the second contextual content module 272b. The context engine 266 is configured to update the weights of each of the candidate content modules 260 in real-time (or near real-time) based on the feedback data 276. The same user system can generate an additional request for an interface, for example by reloading the current interface page, initiating a search, navigating to a different interface page, and/or otherwise requesting a new interface page. When generating the additional interface, the interface generation engine 256 utilizes the updated weights and generates an interface including a second set of contextual content modules that is different than the first set of contextual content modules including in the first interface.

Identification of relevant content on an interface, such as identifying items within a large catalogs of items associated with a network interface, to locate specific items of interest can be difficult and time consuming for users. Typically, users navigate a predefined browse structure, sometimes referred to as a "browse tree," in which interface elements, such as pages or items, are arranged in a predetermined hierarchy, such as by categories or sub-categories. Such browse trees typically include multiple levels, requiring users to navigate through several levels of nodes to reach an item of interest. Thus, the user must perform multiple navigational steps to find items of interest and/or pages including items of interest.

Contextual engines configured to utilize active and implicit feedback, as disclosed herein, significantly reduce this problem, allowing users to locate items of interest with fewer steps. For example, in some embodiments described herein, when a user is presented with content modules containing one or more items, each item includes, or is in the form of, a link to an interface page corresponding to the item of interest, e.g., a product or item page. Each content module thus serves as a programmatically selected navigational shortcut to an interface page, allowing a user to bypass the navigational structure of the browse tree. Beneficially, programmatically identifying content modules including navigation shortcuts, allowing a user to bypass the typical browse tree structure and improve the speed of the user's navigation through an electronic interface. This can be particularly beneficial for computing devices with small screens, where fewer interface elements can be displayed to a user at a time and thus navigation of larger volumes of data is more difficult.

As discussed below, the contextual explore/exploit module 268 allows for optimized content having a short lifetime while simultaneously surfacing new and unseen content modules that can include relevant content elements. The feedback data 276 provides near real-time modification of content module recommendations based on dynamic user interactions and trends. The explore/exploit mechanisms provide for exploration of newly added content while balancing exploitation of known, relevant content for a given user identifier 254.

Figure 7:
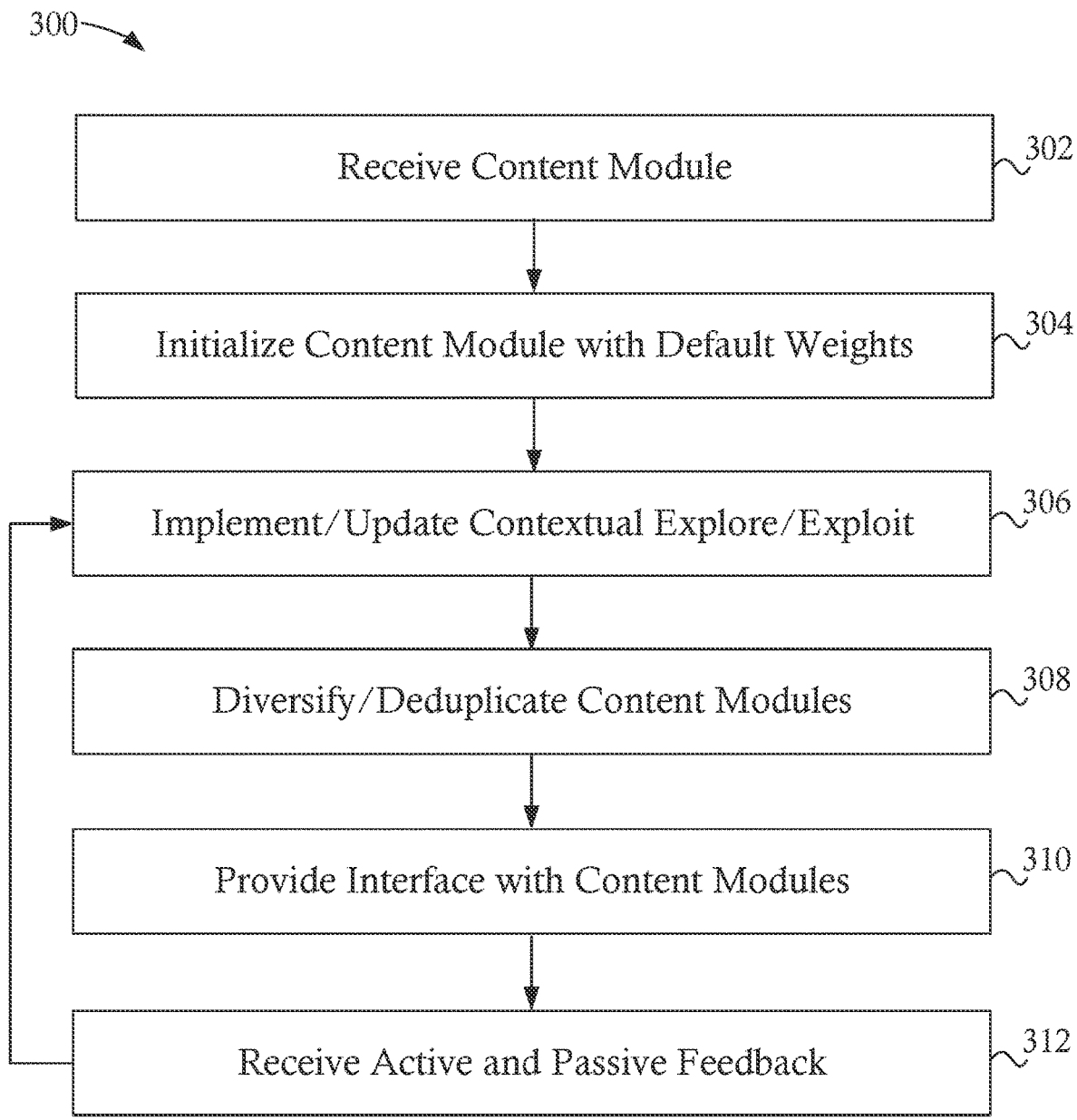
FIG. 7 is a flowchart illustrating a method of weighting content modules for inclusion in a network interface, in accordance with some embodiments.
Figure 8:
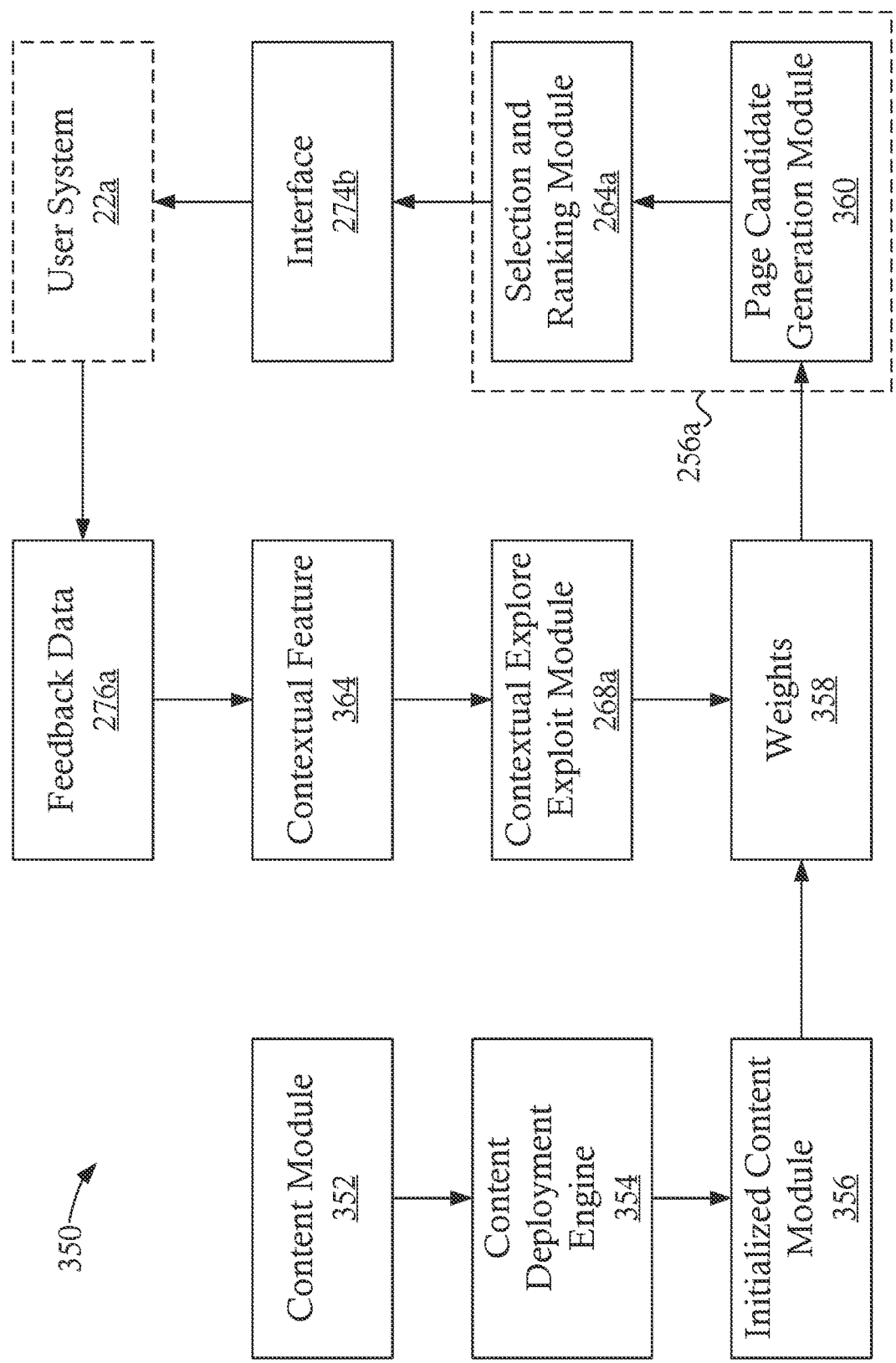
FIG. 8 is a process flow illustrating various steps of the method of weighting content modules, in accordance with some embodiments.

FIG. 7 is a flowchart illustrating a method 300 of weighting content modules using an explore/exploit process, in accordance with some embodiments. FIG. 8 is a process flow 350 illustrating various steps of the method of weighting content modules, in accordance with some embodiments. At step 302, a new content module 352 is received. The content module 352 can be received from any suitable source, such as, for example, an internal content source (e.g., a system associated with an entity operating the contextual content system 26, or an external content source (e.g., a system associated with a third party). The content module 352 can include any suitable content module, such as a carousel or other container including a plurality of selected (e.g., recommended or promoted) items.

At step 304, an initialized content module 356 including a default set of weights is generated. In some embodiments, the initialized content module 356 is generated by a content deployment engine 354 configured to receive and ingest the content module 352. An initialized content module 356 includes necessary data elements for deployment within a production environment including a set of weights 358 used for ranking and selection of a content module, as discussed above with respect to FIGS. 5-7.

The initialized content module 356 includes default values for the weights 358. The default values can be selected, for example, by segmenting the content module 352 into one of the plurality of contexts or groupings associated with an interface. For example, as discussed above, contexts or groupings associated with an interface can include, but are not limited to, new parent, baby, college-age, gamer, hiking, outdoor gear, grocery, etc. The default weights can be associated with global metrics associated with the selected context. For example, in some embodiments, the content deployment engine 354 is configured to apply a default set of weights for a first context associated with the initialized content module 356. It will be appreciated that any suitable set of default weights can be used.

At step 306, a contextual explore/exploit process is implemented. In some embodiments, contextual features 364 are extracted from historical and/or feedback data. Contextual features 364 can include, but are not limited to, interface elements identifying a context of the interface, e.g., search parameters, navigation tree, items, click-throughs, etc. The contextual features 364 can include contextual elements associated with a user system 22a that requested the interface, such as a context segmentation or potential segmentation of a user identifier. In some embodiments, the contextual features 364 can include user category and/or sub-category affinities, user location and demographic information, user system 22a information regarding the device type, system parameters, etc., user understanding signals or data such as price metrics, user historical features representing brand affinities, style affinities, preferences, etc., and/or any other suitable contextual features 364.

In some embodiments, the contextual features 364 and the historical/feedback data are provided to a contextual explore/exploit module 268a. The contextual explore/exploit module is configured to implement an explore/exploit model that generates weights for a plurality of content modules based on a contextual bandit and user affinity process. In some embodiments, a contextual bandit process is configured to receive a subset of the contextual features 364 applicable to one of a plurality of contexts, or segments, and generate weights for the selected context. The contextual bandit model is configured to provide a reward value, e.g., a weight, for certain action, such as click or non-click actions, to each of the provided content modules to generate weights 358 for a selected content module in a selected context.

At step 308, a diversification and deduplication process can be applied to the set of content modules. In some embodiments, a contextual explore/exploit module 268*a* can generate similar weights 358 for content modules containing similar items or content. For example, a set of weights 358 for a first content module associated with promotional items in a first context can have a similar vale to a set of weights 358 for a second content module associated with bestselling or highest traffic items in the first context. A deduplication process can be applied to remove similar content modules, for example, by adjusting weights of the second content module to cause the second content module to be less likely to be selected for inclusion in an interface.

Similarly, a contextual explore/exploit module 268*a* can weight all of the content modules associated with a first context such that the top N content modules selected for a user identifier associated with the first context are selected only from the content modules associated with first context. In some embodiments, a diversification process is applied to adjust weights of one or more content modules to ensure diversity of content within an interface, e.g., that some content modules are selected from different contexts to provide different options within a user interface.

At step 310, an interface 274*b* including the initialized content module 356 is generated and provide to a user system, such as a user system 22*a*. The interface 274*b* can be generated as discussed above with respect to FIGS. 4-6. In some embodiments, an interface generation engine 256*a* includes a page candidate generation module 360 configured to provide a set of candidate content modules to a selection and ranking module 264*a*. The selection and ranking module 264*a* outputs a set of contextual content modules that includes the initialized content module 356. For example, in some embodiments, the default value of the weights 358 is set such that the initialized content module 356 is likely to be ranked higher by the selection and ranking module 264*a*, increasing the likelihood of inclusion in a generated interface, e.g., default values are configured to provide for exploration of new content modules. In some embodiments, an initialized content module 356 can be selected for inclusion in an interface 274*b* based on one or more additional factors, such as a time since deployment metric, that ensures new content modules are deployed into interfaces.

At step 312, feedback data 276*a* is received from the user system 22*a* regarding interactions with the generated interface 274*b*. The feedback data 276*a* can include both active, or positive, feedback including interactions via a user system 22*a* with the initialized content module 356 and/or passive, or negative/inherent, feedback including a lack of interaction with the initialized content module 356. The feedback data 276*a* can be received in real time, near real time, and/or as a background process. The method 300 returns to step 306, and the feedback data 276*a* is provided to the contextual explore/exploit process to update the previous contextual explore/exploit determinations based, at least in part, on the received feedback data 276.

Figure 9:
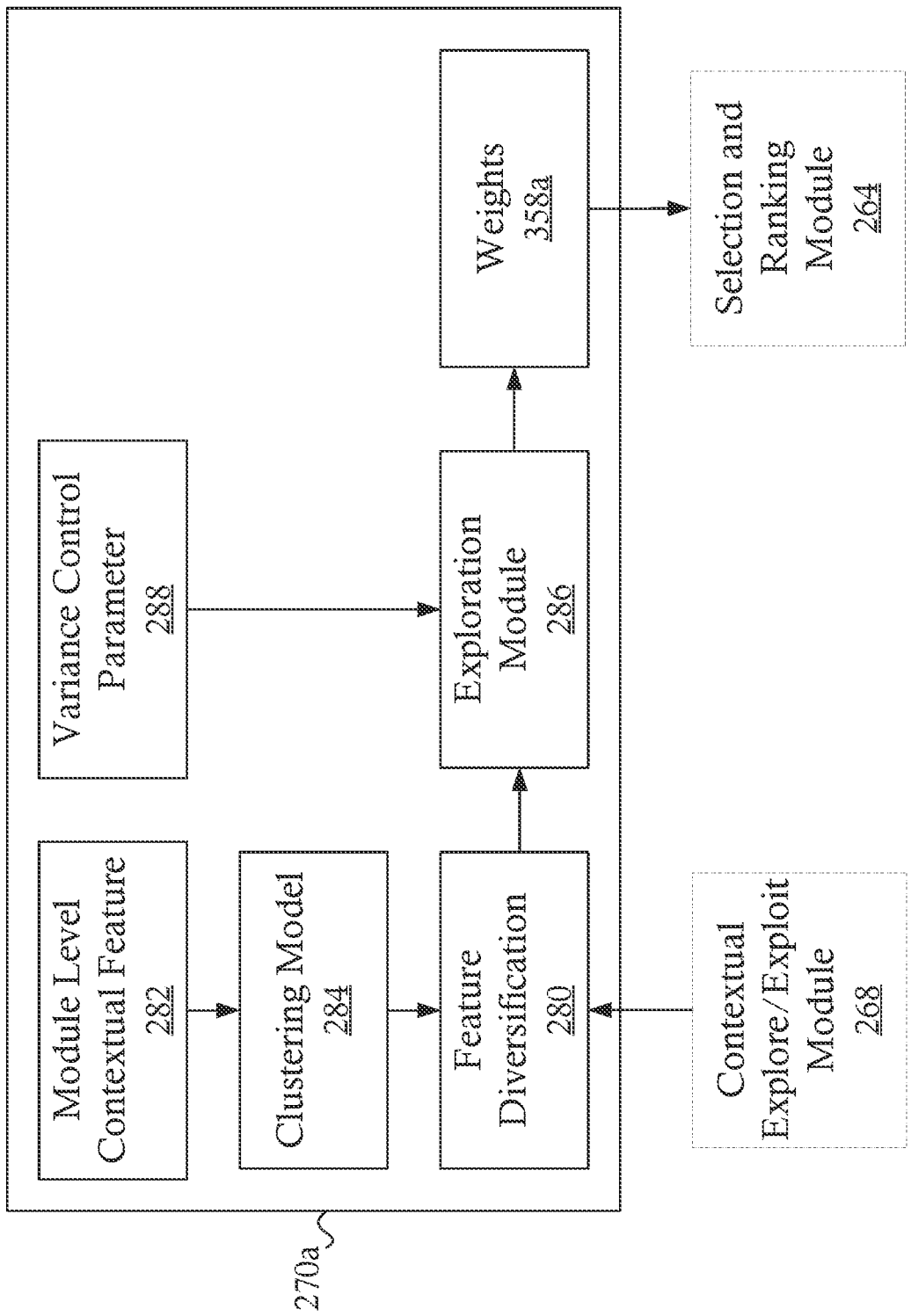
FIG. 9 illustrates a diversification and deduplication module, in accordance with some embodiments.

FIG. 9 illustrates a diversification and deduplication module 270*a*, in accordance with some embodiments. The diversification and deduplication module 270*a* receives an input from a contextual explore/exploit module 266. The input can include the set of candidate content modules 260 and/or the weights 358 for each candidate content module 260. A feature diversification module 280 is configured to diversify the set of candidate content modules 260 to eliminate similar modules within a given context. For example, in the illustrated embodiment, module level contextual features 282 are provided to a clustering model 284 to generate clusters of content modules. In some embodiments, modules within a cluster of content modules can be adjusted such that only a predetermined number, e.g., 1, 2, etc., of content modules from each cluster are weighted highly, e.g., are likely to be selected for inclusion in an interface. Content modules from within a cluster can be selected based on any suitable metric, such as, for example, click through rate. Unselected content modules within a cluster can be de-emphasized by reducing the weights 358 associated with the content module and/or can be removed from the set of candidate content modules 260.

In some embodiments, an exploration module 286 is configured to increase diversity of the candidate content modules 260 through exploration of the universe of content modules. For example, in some embodiments, a variance control parameter 288 is provided that determines the variance, e.g., the exploration amount, that should be included in the content modules selected for inclusion in an interface. In some embodiments, a higher variance control parameter 288 corresponds to greater exploration and a lower variance control parameter 288 corresponds to greater exploitation of the content modules. The exploration module 286 is configured to increase the weights of new, low volume, and/or non-context specific content modules to increase the likelihood of those modules being included in an interface.

The diversification and deduplication module 268*a* updates the weights 358*a* of each of the content modules and/or a group of content modules based on the feature diversification module 280 and/or the exploration module 286. In some embodiments, the diversification and deduplication module 270*a* is configured to provide for content module rankings that promote discovery of new items or content modules based on existing historical information and/or other input signals, as disclosed herein.

With reference again to FIGS. 7-8, at step 314, the weights 358 of each of the content modules, such as the initialized content module 356, are updated based on the contextual explore/exploit module 268*a* and/or a diversification and deduplication module 270*a*. Although specific embodiments are discussed herein including ranking weights 358, it will be appreciated that the explore/exploit module 268*a* and/or the diversification and deduplication module 270 can be configured to adjust a set of candidate content modules 260 in any suitable manner to increase one either exploration or exploitation of the content modules.

Figure 10:
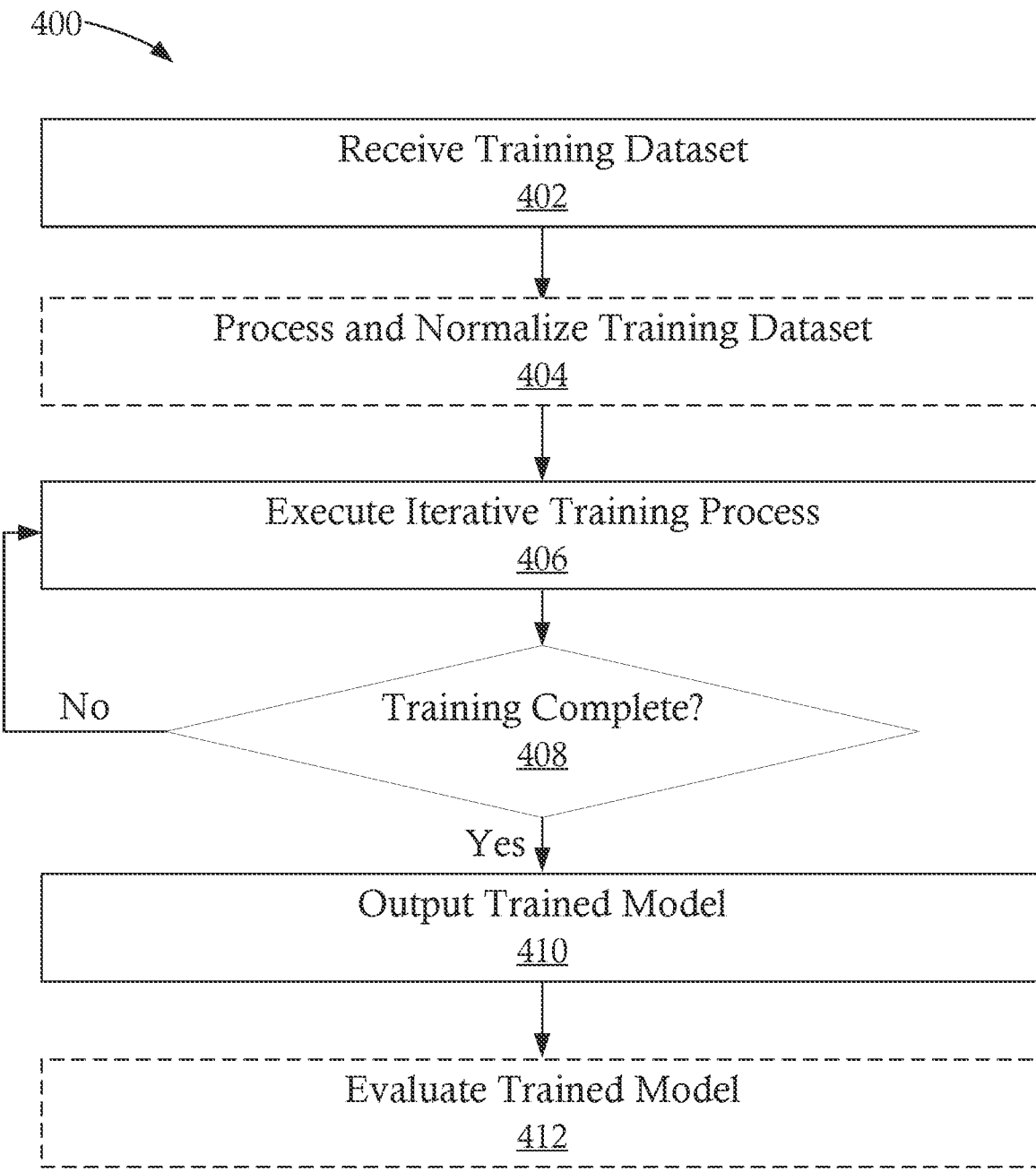
FIG. 10 is a flowchart illustrating a method of generating a trained machine learning model, in accordance with some embodiments.
Figure 11:
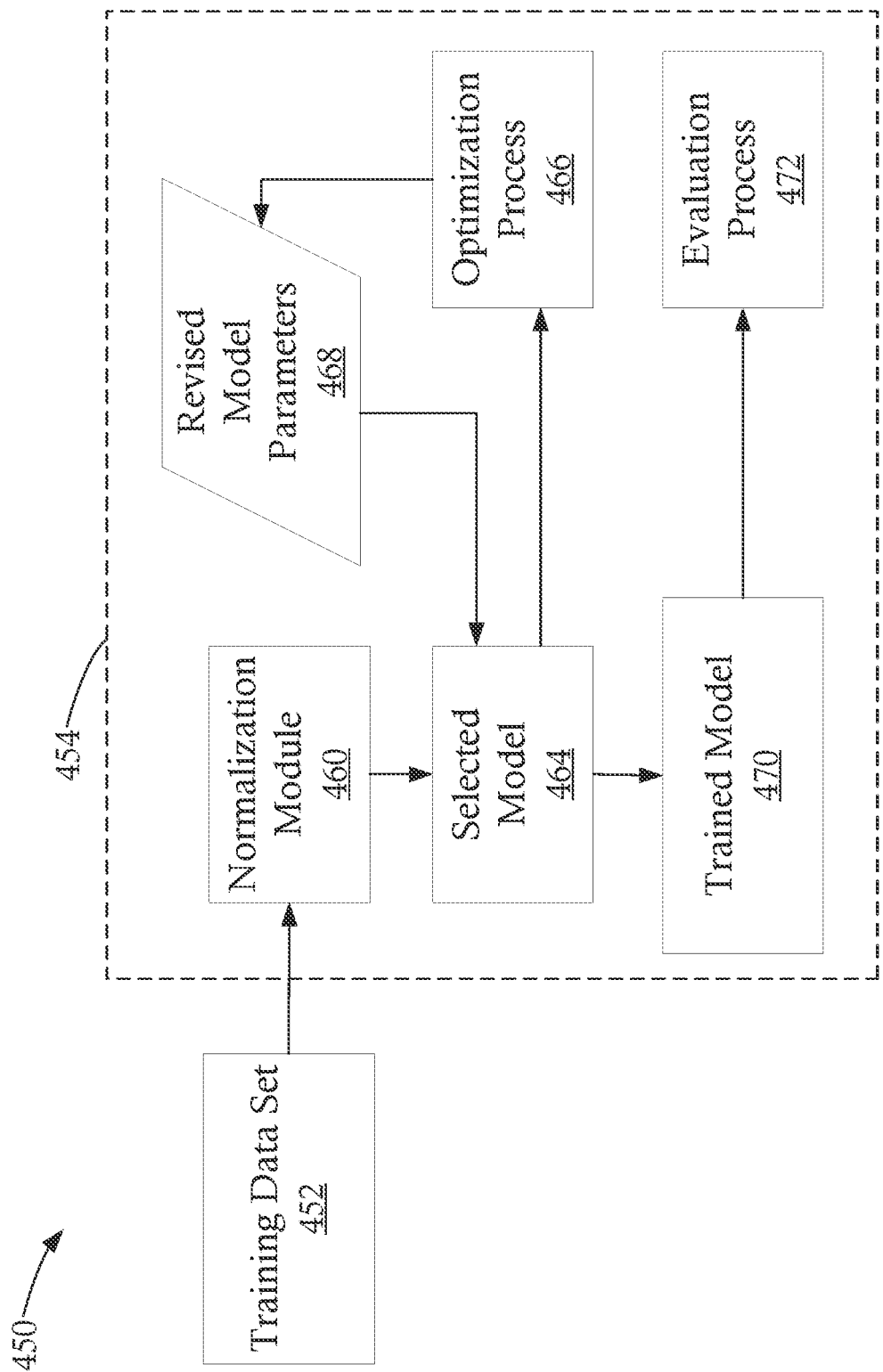
FIG. 11 is a process flow illustrating various steps of the method of generating a trained machine learning model, in accordance with some embodiments.

FIG. 10 is a flowchart illustrating a method 400 of generating a trained machine learning model, in accordance with some embodiments. FIG. 11 is a process flow 450 illustrating various steps of the method of generating a trained machine learning model, in accordance with some embodiments. At step 402, a training dataset 452 is received by model training engine 454. The training dataset 452 can include labeled and/or unlabeled data. For example, in various embodiments, a explore/exploit model can be generated using labeled, unlabeled, and/or semi-labelled training data. The training dataset 452 includes data for training an explore/exploit model. For example, the training dataset 452 can include contextual data, positive (e.g., active) feedback data, negative (e.g., passive) feedback data, reward data, and/or other suitable data.

At optional step 404, the received training dataset 452 is processed and/or normalized by a normalization module 460. In some embodiments, processing of the received training dataset 452 includes outlier detection configured to remove data likely to skew training of a semantic mapping model, such as keywords or titles in a second language, numerical keywords, etc.

At step 406, an iterative training process is executed to train a selected model 464. For example, a model training engine 454 can be configured to obtain a selected model 464 including an untrained (e.g., base) machine learning model, such as an untrained contextual bandit model and/or a partially or previously trained model (e.g., a prior version of a trained model, a partially trained model from a prior iteration of a training process, etc.), from a model store, such as a model store database 32. The model training engine 454 is configured to iteratively adjust parameters (e.g., hyperparameters) of the selected model 464 to minimize a cost value (e.g., an output of a cost function) for the selected model 464. In some embodiments, the cost value is related to a difference between an input value, e.g., a title, term, or keyword, and a decoded embedding.

In some embodiments, the model training engine 454 implements an iterative training process that generates a set of revised model parameters 468 during each iteration. The set of revised model parameters 468 can be generated by applying an optimization process 466 to the cost function of the selected model 464. The optimization process 466 can be configured to reduce the cost value (e.g., reduce the output of the cost function) at each step by adjusting one or more parameters during each iteration of the training process.

After each iteration of the training process, at step 408, the model training engine 454 determines whether the training process is complete. The determination at step 408 can be based on any suitable parameters. For example, in some embodiments, a training process can complete after a predetermined number of iterations. As another example, in some embodiments, a training process can complete when it is determined that the cost function of the selected model 464 has reached a minimum, such as a local minimum and/or a global minimum.

At step 410, a trained contextual explore/exploit model 470, such as a trained contextual bandit model, is generated and, at optional step 412, the trained model 470 can be evaluated by an evaluation process 472. The trained model 470 can be evaluated based on any suitable metrics. For example, in some embodiment, the evaluation process 472 includes an offline policy evaluation system, such as described in U.S. Pat. No. 11,314,529 entitled "Dynamical Switching Between Long-Term and Short-Term Rewards," issued Apr. 26, 2022 and U.S. Pat. No. 11,367,105, entitled "Dynamic evaluation and use of global and contextual personas," issued Jun. 21, 2022. Offline policy evaluation systems can be configured to measure an expected cumulative reward and determine if a reward maximization is improving, stagnant or reducing with respect to time.

Although specific embodiments are discussed herein, it will be appreciated that any suitable set of evaluation metrics can be used to evaluate a trained semantic mapping model.

Although the subject matter has been described in terms of exemplary embodiments, it is not limited thereto. Rather, the appended claims should be construed broadly, to include other variants and embodiments, which can be made by those skilled in the art.

What is claimed is:

1. A system comprising:
   a processor; and
   a non-transitory memory storing instructions that, when executed, cause the processor to:
   generate a first interface including a first set of content modules comprising a set of generic content modules and a set of dynamic content modules selected from a set of candidate content modules based on a set of ranking weights, wherein each content module of the set of content modules includes one or more items including a link to navigate or obtain a function from the first interface;
   receive feedback data representative of one or more interactions with the first interface, wherein the feedback data includes positive feedback and negative feedback;
   generate a trained ranking model by inputting a training dataset including a set of contextual data, positive data, and negative data, wherein the training dataset is normalized by a normalization module, and wherein the trained ranking model is generated by iteratively revising a set of model parameters;
   generate the set of ranking weights for each content module in the set of candidate content modules, wherein the ranking weights are generated by a contextual explore-exploit model based on the feedback data;
   modify the inclusion of each of the dynamic content modules by adjusting the ranking weights for each content module in the set of content modules based on a variance control parameters, wherein the modification is performed by an exploration module;
   receive a request for a second interface including at least a user identifier and a plurality of contexts, wherein each of the plurality of contexts are based on at least one of an event category, a general interest category, or a personalized interest category;
   generate a first user segmentation based on at least one of the user identifier, a first context of the plurality of contexts, and historical user data;
   generate a second segmentation based on at least one of the user identifier, a second context of the plurality of contexts, and historical user data;
   generate, by the trained ranking model, a set of ranked content modules for the first context and the second context, wherein the trained ranking model receives a corresponding user segmentation and a rank of dynamic content, wherein the rank of dynamic content modules is generated based on the user segmentation and the set of ranking weights;
   generate a second set of content modules for the first segmentation and a third set of content modules for the second segmentation;
   generate a second interface including the second set of content modules and the third set of content modules, wherein the second set of content modules and the third set of content modules includes a predetermined number of top ranked content modules in the set of ranked content modules; and
   provide the generated second interface to a user system, wherein a user or operator of the user system may interact with the generated second interface.

2. The system of claim 1, wherein the contextual explore-exploit model includes a contextual bandit model.

3. The system of claim 1, wherein the contextual explore-exploit model receives contextual features extracted from the feedback data.

4. The system of claim 1, wherein the set of ranking weights for each content module is further generated by applying a diversification and duplication process to the ranking weights generated by the contextual explore-exploit model.

5. The system of claim 4, wherein the diversification and deduplication process:
   clusters the set of candidates content modules;
   selects a predetermined number of candidate modules in each cluster; and
   modifies the ranking weights of the predetermined number of candidate content modules in each cluster.

6. The system of claim 4, wherein the diversification and deduplication process modifies the ranking weights of each of the candidate content modules based on a variance control parameter.

7. The system of claim 1, wherein the context of the request for the second interface is generated by a segmentation module that segments the request into one of a plurality of contexts based on historical interaction data associated with the request.

8. The system of claim 1, wherein the first set of content modules includes at least one content module having a default set of ranking weights.

9. The system of claim 1, wherein the positive feedback comprises click rates and the negative feedback comprises non-click rates.

10. A computer-implemented method, comprising:
    generating a first interface including a first set of content modules comprising a set of generic content modules and a set of dynamic content modules selected from a set of candidate content modules based on a set of ranking weights, wherein each content module of the set of content modules includes one or more items including a link to navigate or obtain a function from the first interface;
    receiving feedback data representative of one or more interactions with the first interface, wherein the feedback data includes positive feedback and negative feedback;
    generating a trained ranking model by inputting a training dataset including a set of contextual data, positive data, negative data, wherein the training dataset is normalized by a normalization module, and wherein the trained ranking module is generated by iteratively revising a set of model parameters;
    generating the set of ranking weights for each content module in the set of candidate content modules, wherein the ranking weights are generated by a contextual explore-exploit model based on the feedback data;
    modifying the inclusion of the dynamic content modules by adjusting the ranking weights for each content module in the set of content modules based on a variance control parameter, wherein the modification is performed by an exploration module;
    receiving a request for a second interface including at least a user identifier and a plurality of contexts, wherein each of the plurality of contexts are based on at least one of an event category, a general interest category, or a personalized interest category;
    generating a first user segmentation based on at least one of the user identifier, a first context of the plurality of contexts, and historical user data;
    generating a second segmentation based on at least one of the user identifier, a second context of the plurality of contexts, and historical user data;
    generating, by a trained ranking model, a set of ranked content modules for the first and second context, wherein the trained ranking model receives a corresponding user segmentation and a rank of dynamic content wherein the rank of dynamic content modules is generated based on the user segmentation and the set of ranking weights;
    generating a second set of modules for the first segmentation and a third set of modules for the second segmentation;
    generating a second interface including the second set of content modules and the third set of content modules, wherein each of the second set of content modules and the third set of content modules includes a predetermined number of top ranked content modules in the set of ranked content modules; and
    providing the generated second interface to a user system, wherein a user or operator of the user system may interact with the generated second interface.

11. The computer-implemented method of claim 10, wherein the contextual explore-exploit model includes a contextual bandit model.

12. The computer-implemented method of claim 10, wherein the contextual explore-exploit model receives contextual features extracted from the feedback data.

13. The computer-implemented method of claim 10, wherein the set of ranking weights for each content module is further generated by applying a diversification and duplication process to the ranking weights generated by the contextual explore-exploit model.

14. The computer-implemented method of claim 13, wherein the diversification and deduplication process:
    clusters the set of candidates content modules;
    selects a predetermined number of candidate modules in each cluster; and
    modifies the ranking weights of the predetermined number of candidate content modules in each cluster.

15. The computer-implemented method of claim 13, wherein the diversification and deduplication process modifies the ranking weights of each of the candidate content modules based on a variance control parameter.

16. The computer-implemented method of claim 10, wherein the context of the request for the second interface is generated by a segmentation module that segments the request into one of a plurality of contexts based on historical interaction data associated with the request.

17. The computer-implemented method of claim 10, wherein the first set of content modules includes at least one content module having a default set of ranking weights.

18. The computer-implemented method of claim 10, wherein the positive feedback comprises click rates and the negative feedback comprises non-click rates.

19. A computer-implemented method, comprising:
    receiving a dynamic content module from a set of candidate content modules, the set of candidate content modules including a set of generic content modules and a set of dynamic content modules selected based on a set of ranking weights, each dynamic content module in the set of dynamic content modules including at least one or more items comprising a link to navigate or obtain a function from a first interface;
    initializing the dynamic content module to include a set of default ranking weights;
    generating a first interface including the dynamic candidate content module and the set of generic content modules;

receiving feedback data representative of one or more interactions with the first interface, wherein the feedback data includes positive feedback and negative feedback;

generating a trained ranking model by inputting a training dataset including a set of contextual data, positive data, and negative data, wherein the training dataset is normalized by a normalization module, and wherein the trained ranking model is generated by iteratively revising a set of model parameters;

generating the set of updated ranking weights for the dynamic content module, wherein the ranking set of updated ranking weights is generated by a contextual explore-exploit model based on the feedback data;

modifying the inclusion of each of the dynamic content modules in the set of candidate content modules by adjusting the set of ranking weights for each content module in the set of content modules based on a variance control parameter, wherein the modification is performed by an exploration module;

providing the dynamic content module including the set of updated ranking weights to a ranking process, wherein the ranking process includes using the trained ranking model to receive a plurality of user segmentations and a rank of dynamic content modules, wherein the plurality of user segmentations includes a first user segmentation is-generated based on a user identifier, a first context, and historical user data and a second segmentation based on at least one of the user identifier, a second context, and the historical user data, and wherein the rank of dynamic content modules is generated based on the first user segmentation, the second user segmentation, and the set of ranking weights to rank content modules, wherein the ranking process is configured to select a set of contextual content models for inclusion on a second interface;

generating a second set of modules for the first segmentation and a third set of modules for the second segmentation, wherein the second interface includes the second set of content modules and the third set of content modules; and providing the generated second interface to a user system, wherein a user or operator of the user system may interact with the generated second interface.

20. The computer implemented method of claim 19, wherein the contextual explore-exploit model includes a contextual bandit model and a diversification and deduplication model.

* * * * *